(12) United States Patent
Jiang

(10) Patent No.: US 8,789,118 B2
(45) Date of Patent: Jul. 22, 2014

(54) METHOD, TERMINAL AND SERVER FOR ALLOCATING SIGNAL ROUTE RESOURCE IN VOICE ON DEMAND SERVICE

(75) Inventor: Yong Jiang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 13/298,803

(22) Filed: Nov. 17, 2011

(65) Prior Publication Data
US 2012/0066730 A1    Mar. 15, 2012

Related U.S. Application Data

(63) Continuation of application No. PCT/CN2010/076126, filed on Aug. 19, 2010.

(30) Foreign Application Priority Data

Sep. 10, 2009   (CN) .......................... 2009 1 0161976

(51) Int. Cl.
| | | |
|---|---|---|
| *H04N 7/173* | (2011.01) | |
| *H04N 21/2383* | (2011.01) | |
| *H04N 21/61* | (2011.01) | |
| *H04L 12/56* | (2006.01) | |
| *H04N 21/647* | (2011.01) | |
| *H04N 21/6377* | (2011.01) | |
| *H04N 21/472* | (2011.01) | |
| *H04L 29/06* | (2006.01) | |

(52) U.S. Cl.
CPC ..... *H04N 21/47202* (2013.01); *H04N 21/2383* (2013.01); *H04N 21/6125* (2013.01); *H04N 21/6118* (2013.01); *H04L 45/00* (2013.01); *H04N 21/647* (2013.01); *H04N 21/6377* (2013.01); *H04L 65/4084* (2013.01)
USPC .................. 725/87; 725/95; 725/96; 725/120

(58) Field of Classification Search
None
See application file for complete search history.

(56) References Cited

U.S. PATENT DOCUMENTS 6,725,457 B1 * 4/2004 Priem et al. .................. 718/104
2002/0007491 A1   1/2002 Schiller et al.
(Continued)

FOREIGN PATENT DOCUMENTS

| CN | 101068339 A | 11/2007 |
|---|---|---|
| CN | 101272479 A | 9/2008 |

(Continued)

OTHER PUBLICATIONS

Written Opinion of the International Searching Authority in International Application No. PCT/CN2010/076126 mailed Nov. 11, 2010.

(Continued)

*Primary Examiner* — Brian T Pendleton
*Assistant Examiner* — Jean D Saint Cyr
(74) *Attorney, Agent, or Firm* — Conley Rose, P.C.; Grant Rodolph; Nicholas K. Beaulieu

(57) ABSTRACT

The present invention relates to a method, a terminal and a server for allocating a signal route resource in a Video On Demand (VOD) service. The method includes: sending a route detection message to a VOD server; receiving a route resource list replied by the VOD server; receiving a route detection stream according to a signal route resource in the obtained route resource list; judging, according to the received route detection stream, whether the signal route resource corresponding to the received route detection stream is valid; and reporting valid signal route resource information to the VOD server. Through a signal route detection method, a location of a VOD terminal device is automatically identified, so that roaming of the VOD terminal device may be realized, and when a coverage relation of the terminal is changed, the VOD service may be normally supported without any additional processing.

17 Claims, 15 Drawing Sheets

(56) References Cited

U.S. PATENT DOCUMENTS

| | | | |
|---|---|---|---|
| 2007/0022032 A1* | 1/2007 | Anderson et al. | 705/35 |
| 2009/0196611 A1* | 8/2009 | Farmer et al. | 398/67 |
| 2011/0023061 A1 | 1/2011 | Ji | |
| 2012/0180080 A1* | 7/2012 | Lajoie | 725/14 |

FOREIGN PATENT DOCUMENTS

| | | |
|---|---|---|
| CN | 101272479 A | 9/2008 |
| CN | 101365103 A | 2/2009 |
| CN | 101431535 | 5/2009 |
| CN | 101431535 A | 5/2009 |
| WO | WO 2005/048510 A2 | 5/2005 |
| WO | WO 2009/090307 A1 | 7/2009 |
| WO | WO2011/029366 A1 | 3/2011 |

OTHER PUBLICATIONS

International Search Report from the Chinese Patent Office in International Application No. PCT/CN2010/076126 mailed Nov. 11, 2010.

Extended European Search Report dated (mailed) Feb. 23, 2012, issued in related Application No. 10814968.3-2223, PCT/CN2010076126, Hauwei Technologies Co., Ltd.

* cited by examiner

METHOD, TERMINAL AND SERVER FOR ALLOCATING SIGNAL ROUTE RESOURCE IN VOICE ON DEMAND SERVICE

CROSS-REFERENCE TO RELATED APPLICATIONS

This application is a continuation of International Application No. PCT/CN2010/076126, filed on Aug. 19, 2010, which claims priority to Chinese Patent Application No. 200910161976.6, filed on Sep. 10, 2009, both of which are hereby incorporated by reference in their entireties.

FIELD OF THE INVENTION

The present invention relates to the field of digital television technologies, and in particular to a method, a terminal, and a server for allocating a signal route resource, an IP Quadrature Amplitude Modulation (IPQAM)/Quadrature Amplitude Modulation (QAM) resource, in a Video On Demand (VOD) service.

BACKGROUND OF THE INVENTION

With the continuous development of the radio and television industry, a user may select contents of interest to demand for viewing according to a preference. In this case, directivity is required when an on-demand program stream (an audio/video program signal) is sent to a VOD terminal device. In a VOD process, the directivity of sending the on-demand program stream to the VOD terminal means that an allocated IPQAM/QAM resource, that is, a signal route resource, is required to be able to cover the VOD terminal, that is, a signal modulated and broadcasted through the IPQAM/QAM can reach the VOD terminal.

In a digital television network, directivity of delivering a program stream in a VOD to a user terminal is manifested by the allocated IPQAM/QAM resource, and the main basis of achieving allocation of the IPQAM/QAM resource is which IPQAM/QAM resources cover the VOD terminal currently, that is, a location of the VOD terminal needs to be identified. Conventionally, in the field of the digital television, a static configuration scheme is adopted to provide configuration function in a VOD server system, so as to realize configuration management of a corresponding relation between the VOD terminal device and the IPQAM/QAM resource of the VOD server, which means that the location of the VOD terminal is fixed. In this case, when the user requests an on-demand program, the VOD server searches, according to the VOD terminal device requesting the on-demand program, static configuration information of the relation between the VOD terminal device and the IPQAM/QAM resource to obtain an IPQAM/QAM resource that may be used for broadcasting the on-demand program this time, which means that a signal route for the program to be broadcast to the VOD terminal device is determined. In this way, the VOD terminal device can only be used in a fixed location and cannot roam; configuration is complex, and the configuration relation is very complex since generally many VOD terminal devices exist; and when the system scale becomes bigger, an IPQAM/QAM device needs to move down, so the configuration relation needs to be reconfigured.

SUMMARY OF THE INVENTION

In order to overcome the problems exist in the prior art, the present invention provides a method, a terminal, and a server for allocating a signal route resource in a VOD service.

An embodiment of the present invention provides a method for allocating a signal route resource in a VOD service, where the method includes: sending a route detection message to a VOD server; receiving a route resource list replied by the VOD server; receiving a route detection stream according to the signal route resource in the obtained route resource list; judging, according to the received route detection stream, whether the signal route resource corresponding to the received route detection stream is valid; and reporting valid signal route resource information to the VOD server.

An embodiment of the present invention further provides a VOD terminal, where the terminal includes: a detection message sending unit, configured to send a route detection message to a VOD server; a route list obtaining unit, configured to receive a route resource list replied by the VOD server; a detection stream receiving unit, configured to receive a route detection stream according to a signal route resource in the obtained route resource list; a valid route judgment unit, configured to judge, according to the received route detection stream, whether the signal route resource corresponding to the received route detection stream is valid; and a detection result reporting unit, configured to report a valid signal route resource to the VOD server.

An embodiment of the present invention further provides a method for allocating a signal route resource in a VOD service, where the method includes: receiving a route detection message sent by a VOD terminal; sending a route detection stream according to the received route detection message; generating a route resource list according to a signal route resource corresponding to the sent route detection stream, and sending the route resource list; receiving valid signal route resource information in the route resource list sent by the VOD terminal; and generating a corresponding relation between the VOD terminal and the signal route resource according to the received valid signal route resource information.

An embodiment of the present invention provides a VOD server, where the server includes: a detection message receiving unit, configured to receive a route detection message sent by a VOD terminal; a detection stream sending unit, configured to send a route detection stream according to the received route detection message; a route list generating unit, configured to generate a route resource list according to a signal route resource corresponding to the sent route detection stream, and send the route resource list; a detection result receiving unit, configured to receive valid signal route resource information sent by the VOD terminal; and a route relation generating unit, configured to generate a corresponding relation between the VOD terminal and the signal route resource information according to the received valid signal route resource information.

In the embodiments of the present invention, without changing a conventional architecture, through cooperation of a VOD terminal and a VOD server, and by using a signal route detection method, a location of the VOD terminal device is automatically identified, and a corresponding relation between the VOD terminal device and the IPQAM/QAM resource of the VOD server is automatically established. In this way, as long as a VOD terminal device accesses the network, automatic identification of the location of the VOD terminal device and automatic establishment of the resource relation may be realized. Therefore, a complex relation configuration management function is no longer required, and a fixed use location of the VOD terminal device is no longer required, so roaming of the VOD terminal device is easily realized. Furthermore, the automatic identification of the location of the VOD terminal device and the automatic establishment of the resource relation is automatically completed each time the VOD terminal device is started, so when a coverage relation of the IPQAM/QAM resource to the VOD terminal device is changed, the VOD service may be normally supported without any additional processing.

BRIEF DESCRIPTION OF THE DRAWINGS

Accompanying drawings described herein enable further understanding of the invention, are a part of this application, and are not intended to limit the present invention. In the accompanying drawings.

DETAILED DESCRIPTION OF THE EMBODIMENTS

In order to make the objectives, technical solutions, and advantages of the present invention more comprehensible, the present invention is further described in detail below with reference to the embodiments and the accompanying drawings. Herein, the exemplary embodiments of the present invention and their descriptions are used to explain rather than to limit the present invention.

Embodiment 1

Figure 1:
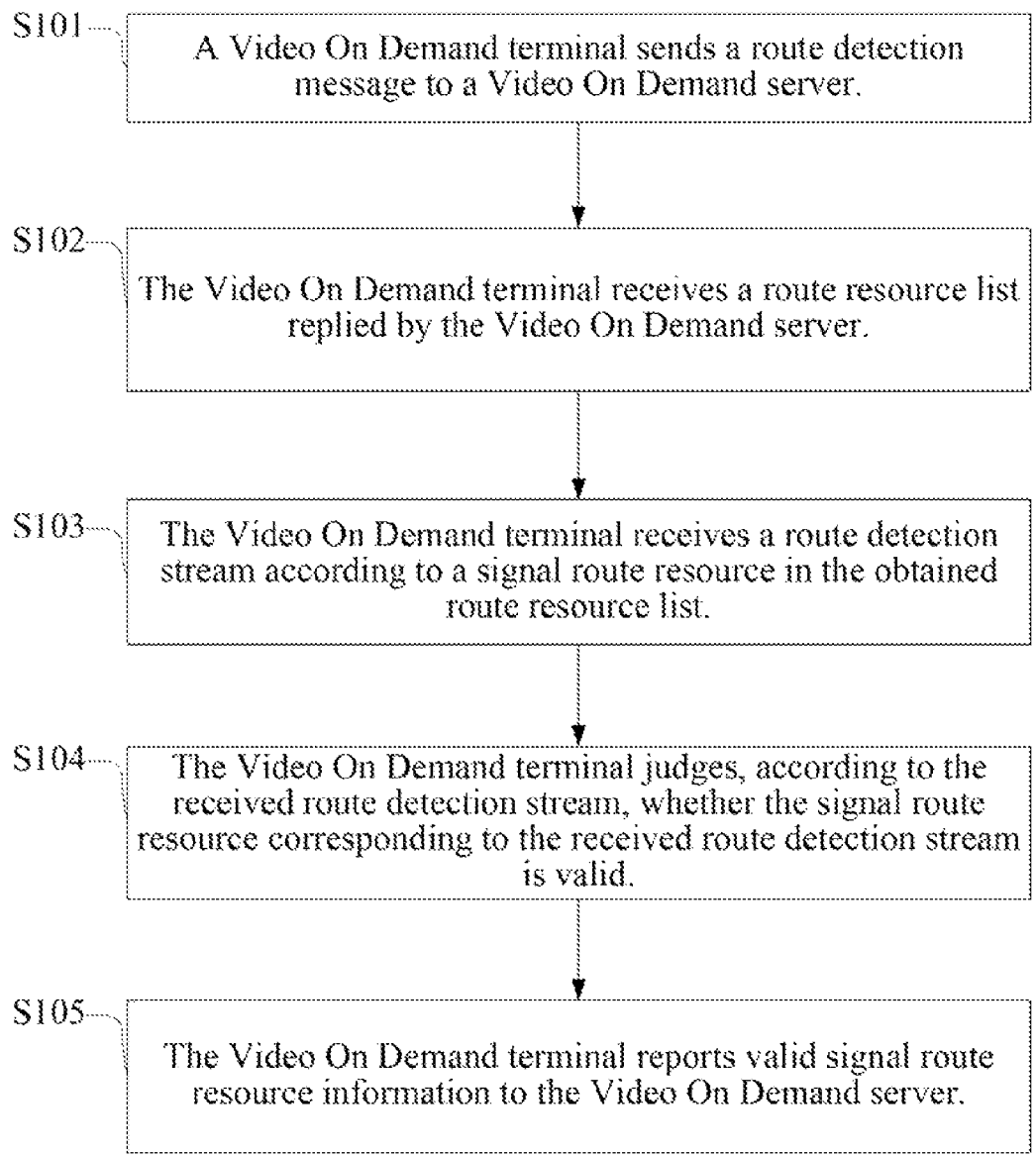
FIG. 1 is a flow chart of a method for allocating a signal route resource in a VOD service according to an embodiment of the present invention.

FIG. 1 is a flow chart of a method for allocating a signal route resource in a VOD terminal service according to an embodiment of the present invention. As shown in FIG. 1, the method for allocating the signal route resource in the VOD terminal service includes the following.

Step S101: A VOD terminal sends a route detection message to a VOD server.

In the embodiment of the present invention, the VOD terminal may be a set-top box, and the VOD server may be a head end VOD system. The VOD terminal may send the route detection message to the VOD server when being started. Parameters of the route detection message are VOD terminal device information, at least including: a VOD terminal identifier and an IC card number.

Step S102: The VOD terminal receives a route resource list replied by the VOD server.

In the embodiment of the present invention, the route resource list may be an IPQAM/QAM resource list. After receiving the route detection message, the VOD server allocates an idle IPQAM/QAM resource in each IPQAM/QAM resource group, where each piece of IPQAM/QAM resource information at least includes an IP address for IPQAM/QAM, an IPQAM/QAM inflow port, a frequency point for broadcasting a program stream, a service identifier of the program stream, a symbol rate, and a modulation value. Several pieces of IPQAM/QAM resource information form a list of IPQAM/QAM resource group identifiers and IPQAM/QAM resources, where the list is named the IPQAM/QAM resource list. The VOD terminal receives the route resource list replied by the VOD server.

Step S103: The VOD terminal receives a route detection stream according to the signal route resource in the obtained route resource list.

In the embodiment of the present invention, the VOD terminal processes in sequence each piece of signal route resource information in the route resource list according to the route resource list, and receives the route detection stream according to the signal route resource.

Step S104: The VOD terminal judges, according to the received route detection stream, whether the signal route resource corresponding to the received route detection stream is valid.

In the embodiment of the present invention, the VOD terminal receives the route detection stream, judges, according to the received route detection stream, whether the signal route resource corresponding to the route detection stream is valid, completes route detection, and records a valid signal route resource in a detection result report.

Step S105: The VOD terminal reports valid signal route resource information to the VOD server.

In the embodiment of the present invention, the VOD terminal sends the detection result report that includes a valid signal route resource record to the VOD server.

Figure 2:
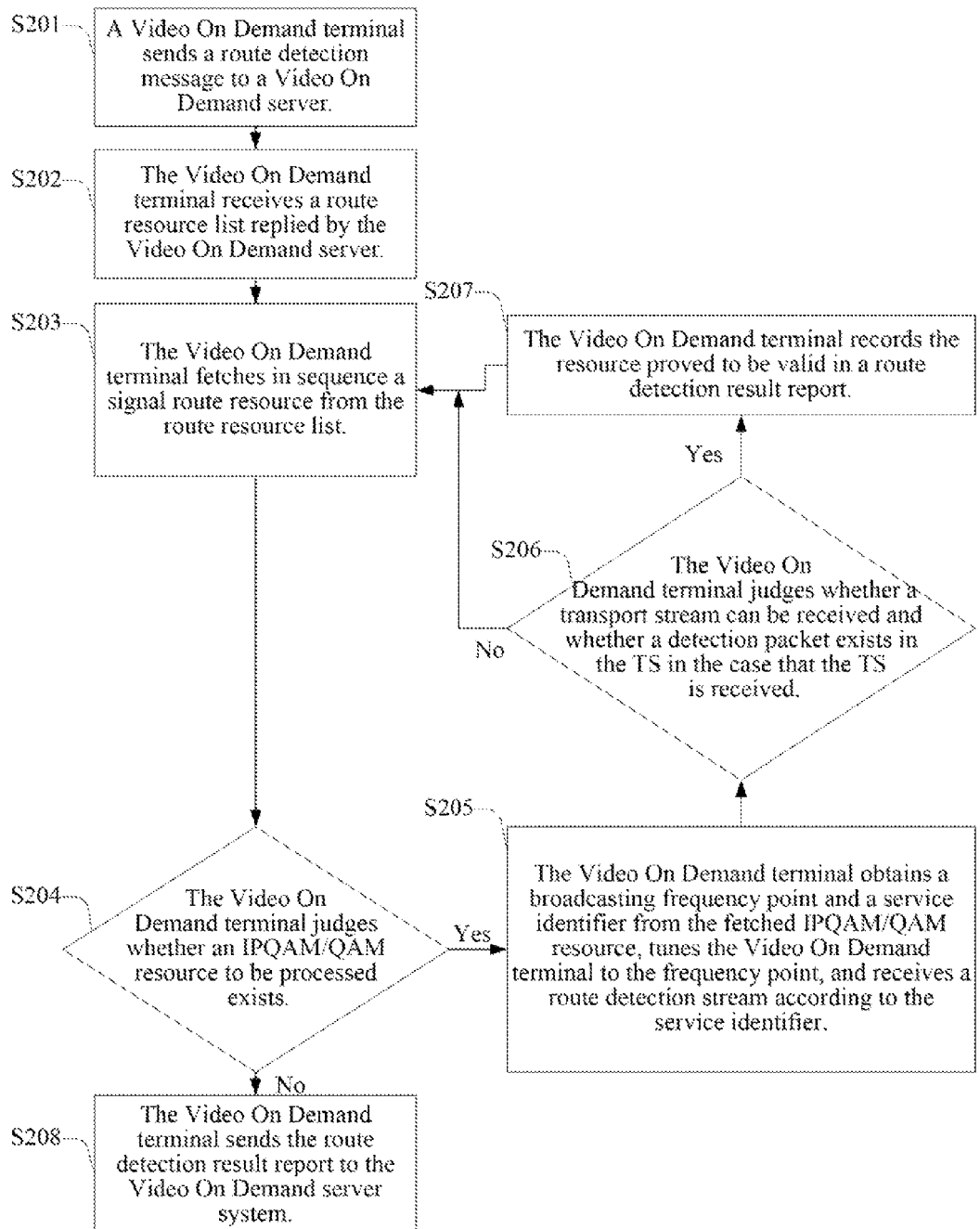
FIG. 2 is a flow chart of a method for allocating a signal route resource in a VOD service according to an embodiment of the present invention.

FIG. 2 is a detailed flow chart of a method for allocating a signal route resource in a VOD terminal service according to an embodiment of the present invention. In the embodiment of the present invention, a VOD terminal may be a set-top box, and a VOD server may be a head end VOD system. The VOD terminal interacts with the VOD server to obtain a route resource list, detects validity of routes respectively according to the list, records a valid route in a detection result report, and sends the report to the VOD server system. As shown in FIG. 2, the method for allocating the signal route resource in the VOD terminal service includes the following.

Step S201: The VOD terminal sends a route detection message to the VOD server.

Step S202: The VOD terminal receives a route resource list replied by the VOD server.

Step S203: The VOD terminal fetches in sequence a signal route resource from the route resource list, where the signal route resource may be an IPQAM/QAM resource.

Step S204: The VOD terminal judges whether an IPQAM/QAM resource to be processed exists. Processing according to a judgment result is as follows.

If the IPQAM/QAM resource can be fetched, a subsequent process continues, so as to complete route detection.

If no IPQAM/QAM resource to be processed exists, step S208 is performed to send the detection result report to the VOD server.

Step S205: The VOD terminal obtains a broadcasting frequency point and a service identifier from the fetched IPQAM/QAM resource, tunes the VOD terminal to the frequency point, and receives a route detection stream according to the service identifier, where the route detection stream may be a transport stream (TS).

Step S206: The VOD terminal judges whether the TS can be received and whether a detection packet exists in the TS in the case that the TS is received. Processing according to a judgment result is as follows:

If the TS can be received and the stream includes a detection packet, it is indicated that the resource is a valid route for the current VOD terminal, and a subsequent process continues to complete location identification.

If the TS is not received or the TS does not include a detection packet, the IPQAM/QAM resource is an invalid route for the current VOD terminal, and step S203 is performed to continue to process subsequent IPQAM/QAM resources in the list.

The VOD server may construct a TS of 2-minute duration, where the TS includes a detection packet. A structure of the detection packet only needs to comply with a packet structure of a TS in a DVB standard. A packet identifier of the detection packet has a certain degree of privacy and may be selected form packet identifiers (0x0020-0x1FFE) of a user-defined segment specified by the DVB standard. For example, 0x1FFD may be selected as the packet identifier of the detection packet.

Step S207: The VOD terminal records the resource that is proved to be valid in a route detection result report, where the result report at least includes a VOD terminal identifier and an IPQAM/QAM resource group identifier. Step S203 is performed to continue to process the subsequent resources in the resource list.

Step S208: The VOD terminal sends the route detection result report to the VOD server system.

Figure 3A:
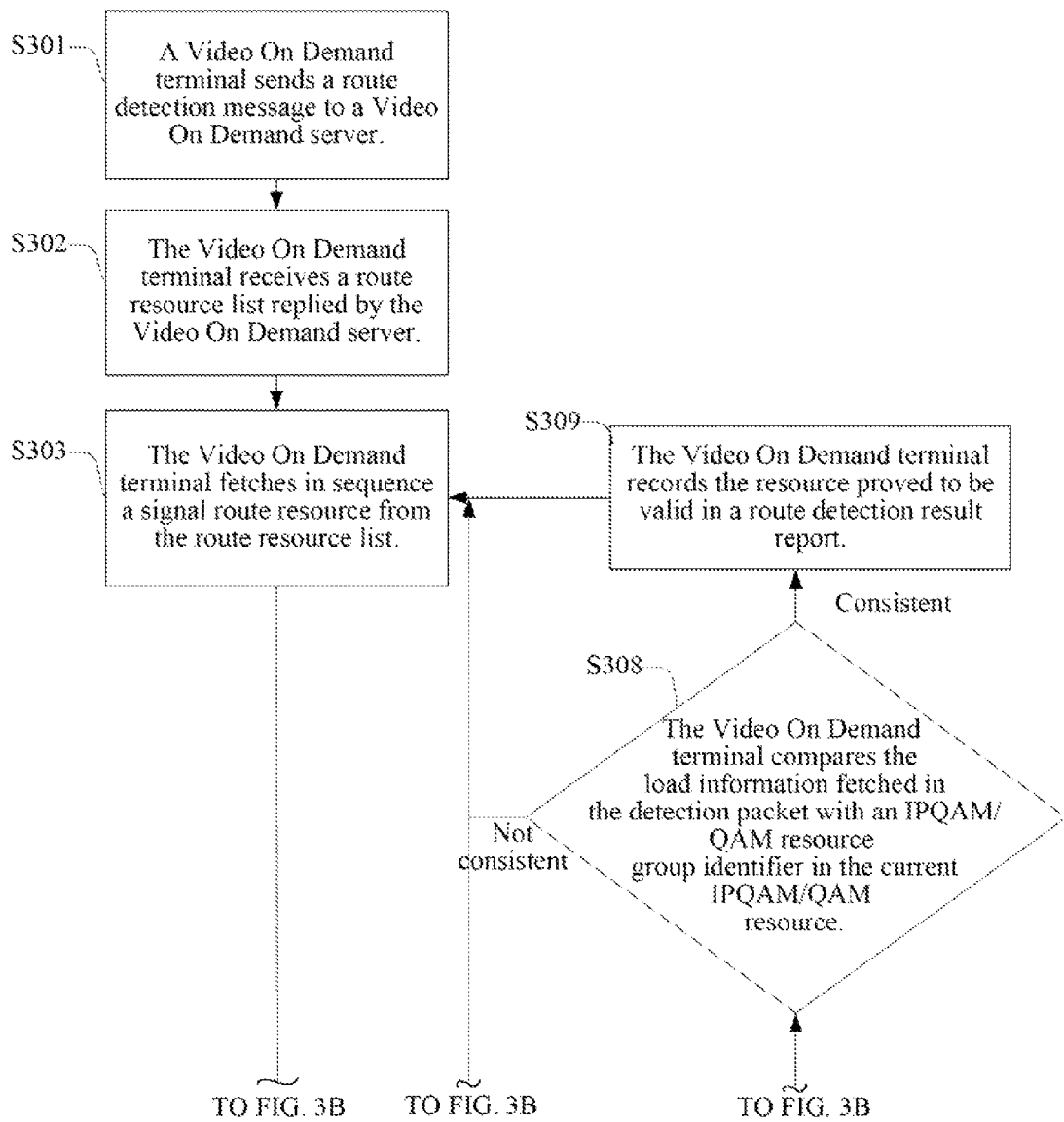
FIG. 3 is a flow chart of a method for allocating a signal route resource in a VOD service according to an embodiment of the present invention.
Figure 3B:
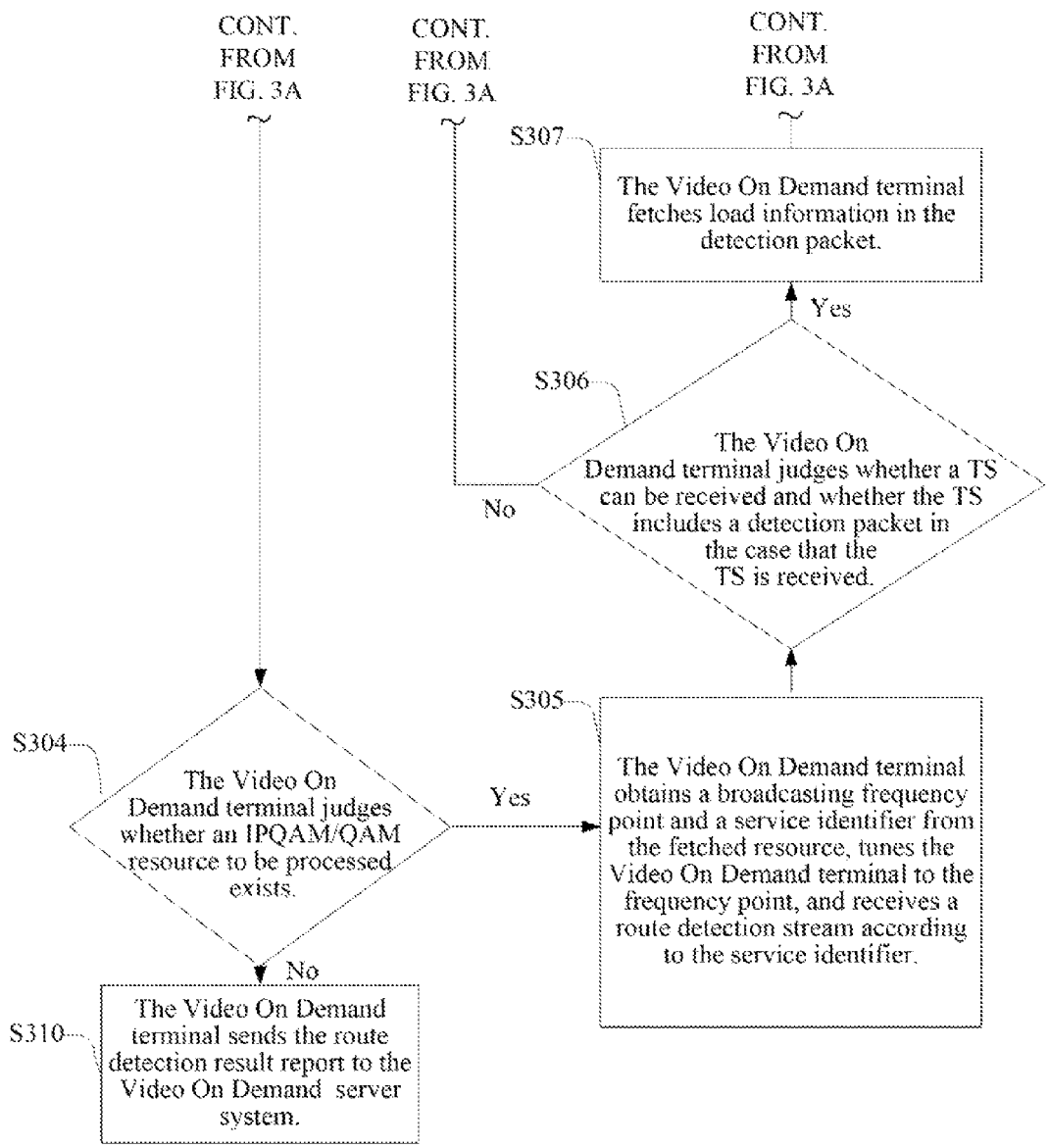

FIG. 3 is a flow chart of a method for allocating a signal route resource in a VOD terminal service according to an embodiment of the present invention. What is different from the method shown in FIG. 2 is that, in the case that a VOD terminal can receive a TS according to a broadcasting frequency point and a stream service identifier which are indicated by a current IPQAM/QAM resource, and judges that the stream includes a detection packet, after fetching the detection packet, the VOD terminal needs to further fetch load information in the detection packet, and compare the load information with an IPQAM/QAM resource group identifier in the current IPQAM/QAM resource, and judge a route determined by the resource to be valid only if the load information and an IPQAM/QAM resource group identifier are consistent. As shown in FIG. 3, the method for allocating the signal route resource in the VOD terminal service includes the following.

Step S301: The VOD terminal sends a route detection message to a VOD server.

Step S302: The VOD terminal receives a route resource list replied by the VOD server.

Step S303: The VOD terminal fetches in sequence a signal route resource from the route resource list, where the signal route resource may be an IPQAM/QAM resource.

Step S304: The VOD terminal judges whether an IPQAM/QAM resource to be processed exists. Processing according to a judgment result is as follows.

If the IPQAM/QAM resource can be fetched, a subsequent process continues, so as to complete route detection.

If no IPQAM/QAM resource to be processed exists, step S310 is performed to send a detection result report to the VOD server.

Step S305: The VOD terminal obtains a broadcasting frequency point and a service identifier from the fetched resource, tunes the VOD terminal to the frequency point, and receives a route detection stream according to the service identifier.

Step S306: The VOD terminal judges whether a TS can be received and whether the TS includes a detection packet in the case that the TS is received. Processing according to a judgment result is as follows.

If the TS can be received and the TS includes a detection packet, step S307 is performed to continue.

If the TS is not received or the TS does not include a detection packet, the resource is an invalid route for the current terminal, and step S303 is performed to continue to process subsequent resources in the list.

Step S307: The VOD terminal fetches load information in the detection packet.

Step S308: The VOD terminal compares the load information, which is fetched in the detection packet, with an IPQAM/QAM resource group identifier in the current IPQAM/QAM resource.

If the load information is not consistent with the IPQAM/QAM resource group identifier, it is indicated that the resource is not a valid route, and the processing on the current resource is ended, and step S303 is performed to continue to process the subsequent resources in the detection list.

If the load information is completely consistent with the IPQAM/QAM resource group identifier, the resource is a valid route for the current VOD terminal, and step S309 is performed to complete location identification.

Step S309: The VOD terminal records the resource that is proved to be valid in a route detection result report, where the result report at least includes a VOD terminal identifier and an IPQAM/QAM resource group identifier. Step S303 is performed to continue to process the subsequent resources in the resource list.

Step S310: The VOD terminal sends the route detection result report to the VOD server system.

In the embodiment of the present invention, without changing a conventional architecture, through cooperation of the VOD terminal and the VOD server, and by using a signal route detection method, a location of the VOD terminal device is automatically identified, and a corresponding relation between the VOD terminal device and the IPQAM/QAM resource of the VOD server is automatically established. In this way, as long as a VOD terminal device accesses the network, automatic identification of the location of the VOD terminal device and automatic establishment of the resource relation may be realized. Therefore, a complex relation configuration management function is no longer required, and a fixed use location of the VOD terminal device is on longer required, so roaming of the VOD terminal device is easily realized. Furthermore, the automatic identification of the location of the VOD terminal device and the automatic establishment of the resource relation is automatically completed each time the VOD terminal device is started, so when a coverage relation of the IPQAM/QAM resource to the VOD terminal device is changed, the VOD service can be normally supported without any additional processing.

Embodiment 2

Figure 4:
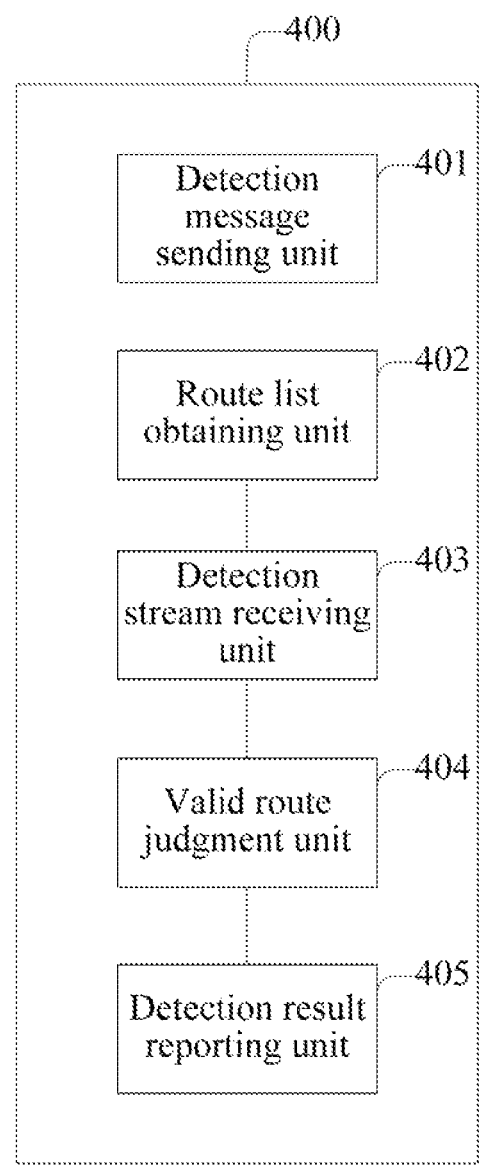
FIG. 4 is a block diagram of a VOD terminal according to an embodiment of the present invention.

FIG. 4 is a block diagram of a VOD terminal according to an embodiment of the present invention. As shown in FIG. 4, a VOD terminal 400 includes the following.

A detection message sending unit 401 is configured to send a route detection message to a VOD server.

In the embodiment of the present invention, the VOD terminal 400 may be a set-top box, and the VOD server may be a VOD system. The detection message sending unit 401 sends the route detection message to the VOD server when the VOD terminal is started. Parameters of the route detection message are VOD terminal device information, at least including: a VOD terminal identifier and an IC card number.

A route list obtaining unit 402 is configured to receive a route resource list replied by the VOD server.

In the embodiment of the present invention, after receiving a route detection request, the VOD server allocates an idle IPQAM/QAM resource in each IPQAM/QAM resource group, where each piece of idle IPQAM/QAM resource information at least includes an IP address for IPQAM/QAM, an IPQAM/QAM inflow port, a frequency point for broadcasting a program stream, a service identifier of the program stream, a symbol rate, and a modulation value. Several pieces of IPQAM/QAM resource information form a list of IPQAM/QAM resource group identifiers and IPQAM/QAM resources, where the list is named an IPQAM/QAM resource list. The route list obtaining unit 402 receives a message replied by the VOD server and obtains the route resource list from the message replied by the VOD server.

A detection stream receiving unit 403 is configured to receive a route detection stream according to a signal route resource in the obtained route resource list.

In the embodiment of the present invention, the detection stream receiving unit 403 processes in sequence each signal routing resource according to the routing resource list, and receives the route detection stream.

A valid route judgment unit 404 is configured to judge, according to the received route detection stream, whether the signal route resource corresponding to the received route detection stream is valid.

In the embodiment of the present invention, the valid route judgment unit 404 receives the route detection stream, judges whether the signal routing resource corresponding to the received route detection stream is valid, completes route detection, and records a valid route in a detection result report.

A detection result reporting unit 405 is configured to report valid signal route resource information to the VOD server.

In the embodiment of the present invention, the detection result reporting unit 405 sends the detection result report to the VOD server.

In the embodiment of the present invention, without changing a conventional architecture, through cooperation of the VOD terminal and the VOD server, and by using a signal route detection method, a location of the VOD terminal device is automatically identified, and a corresponding relation between the VOD terminal device and the IPQAM/QAM resource of the VOD server is automatically established. In this way, as long as a VOD terminal device accesses the network, automatic identification of the location of the VOD terminal device and automatic establishment of the resource relation may be realized. Therefore, a complex relation configuration management function is no longer required, and a fixed use location of the VOD terminal device is no longer required, so roaming of the VOD terminal device is easily realized. Furthermore, the automatic identification of the location of the VOD terminal device and the automatic establishment of the resource relation is automatically completed each time the VOD terminal device is started, so when a coverage relation of the IPQAM/QAM resource to the VOD terminal device is changed, the VOD service may be normally supported without any additional processing.

Embodiment 3

Figure 5:
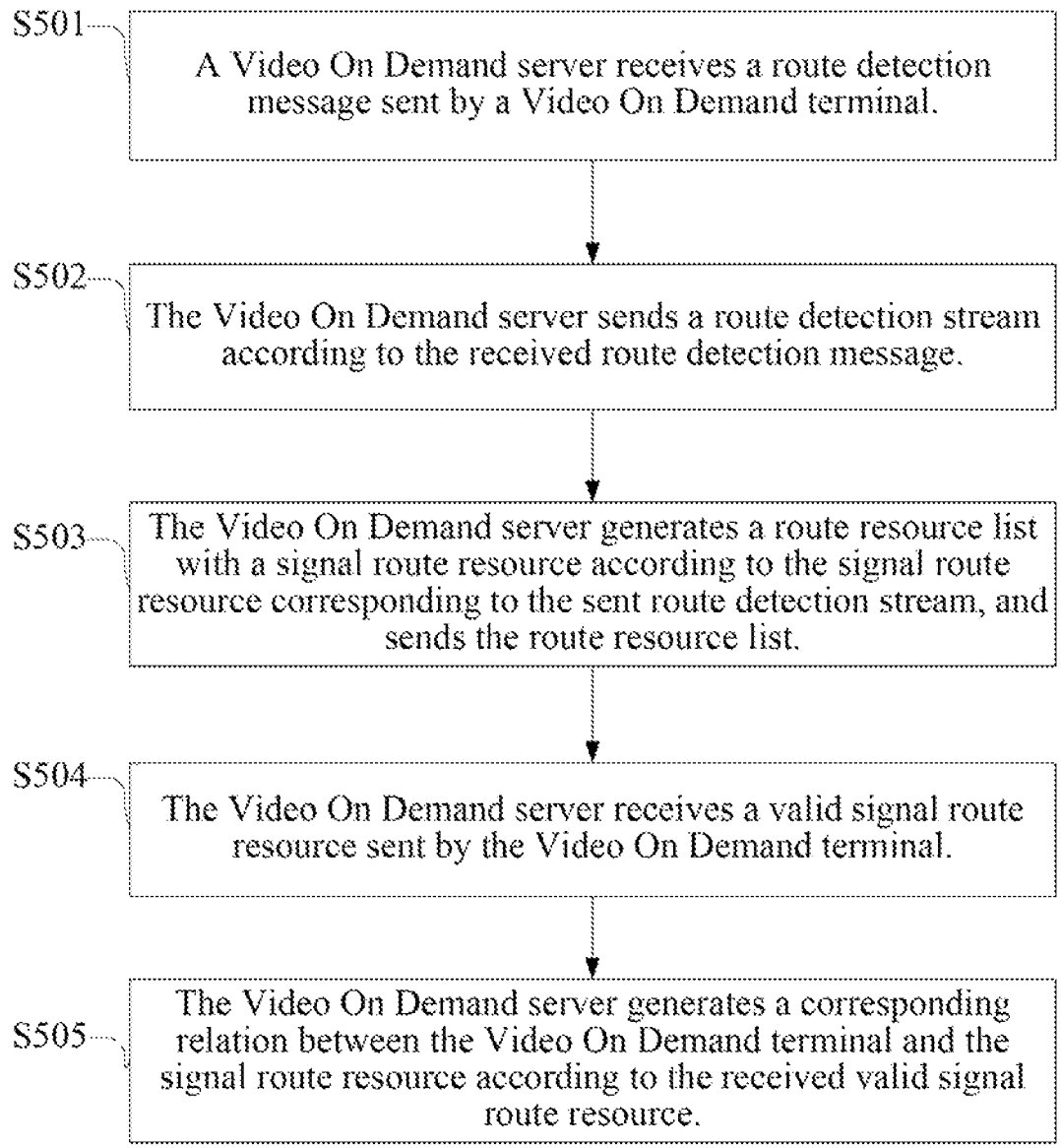
FIG. 5 is a flow chart of a method for allocating a signal route resource in a VOD service according to an embodiment of the present invention.

FIG. 5 is a flow chart of a method for allocating a signal route resource in a VOD terminal service according to an embodiment of the present invention. As shown in FIG. 5, the method for allocating the signal route resource in the VOD terminal service includes the following.

Step S501: A VOD server receives a route detection message sent by a VOD terminal.

In the embodiment of the present invention, the VOD terminal may be a set-top box, and the VOD server may be a VOD system. The VOD server receives the route detection message sent by the VOD terminal. Parameters of the route detection message are VOD terminal device information, at least including: a VOD terminal identifier and an IC card number.

Step S502: The VOD server sends a route detection stream according to the received route detection message.

In the embodiment of the present invention, after receiving a route detection message, the VOD server allocates an idle signal route resource in each IPQAM/QAM resource group, where the signal route resource may be an IPQAM/QAM resource, and resource information at least includes an IP address for IPQAM/QAM, an IPQAM/QAM inflow port, a frequency point for broadcasting a program stream, a service identifier of the program stream, a symbol rate, and a modulation value. A list of IPQAM/QAM resource group identifiers and IPQAM/QAM resources, where the list is named an IPQAM/QAM resource list, is finally formed. The VOD server processes in sequence each piece of detection information according to the IPQAM/QAM resource list. The processing of each piece of information includes: firstly, requesting broadcasting the route detection stream; secondly, broadcasting the route detection stream according to IPQAM/QAM designated by the request; thirdly, modulating, by the IPQAM/QAM, the route detection stream and then broadcasting the route detection stream to a user. The VOD server completes output of the detection stream to the designated IPQAM/QAM according to indicated IPQAM/QAM resource information, and requires the IPQAM/QAM to modulate the detection stream according to a designated broadcasting frequency point, stream service identifier, symbol rate, and modulation value and then output the detection stream to the VOD terminal.

Step S503: The VOD server generates a route resource list with the signal route resource according to the signal route resource corresponding to the sent route detection stream and sends the route resource list.

In the embodiment of the present invention, the VOD server generates the route resource list with the signal route resource according to the signal route resource corresponding to the sent route detection stream and sends the route resource list to the VOD terminal.

Step S504: The VOD server receives a valid signal route resource sent by the VOD terminal.

In the embodiment of the present invention, the VOD server receives a route detection report that includes the valid signal route resource and is sent by the VOD terminal.

Step S505: The VOD server generates a corresponding relation between the VOD terminal and the signal route resource according to the received valid signal route resource.

In the embodiment of the present invention, after receiving the route detection report that includes the valid signal route resource, the VOD server releases all the IPQAM/QAM resources in the route resource list respectively. The VOD server requests a function of processing a relation between the terminal device and the IPQAM/QAM resource to record a terminal location, fetch a valid signal route resource record in the detection report, and establish a corresponding relation between the VOD terminal device and the IPQAM/QAM resource group.

Figure 6A:
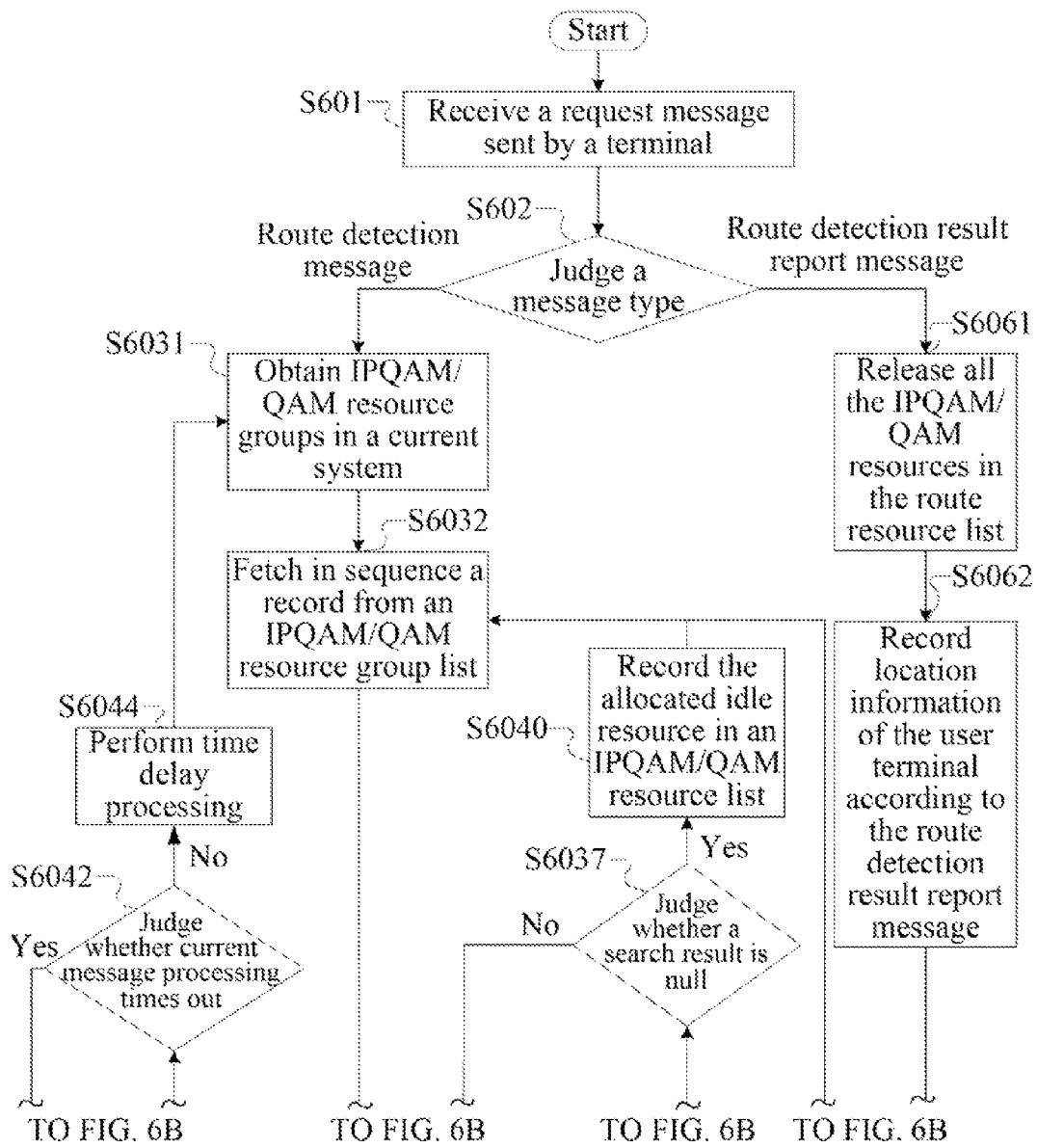
FIG. 6 (6A, 6B and 6C) is a flow chart of a method for allocating a signal route resource in a VOD service according to an embodiment of the present invention.
Figure 6B:
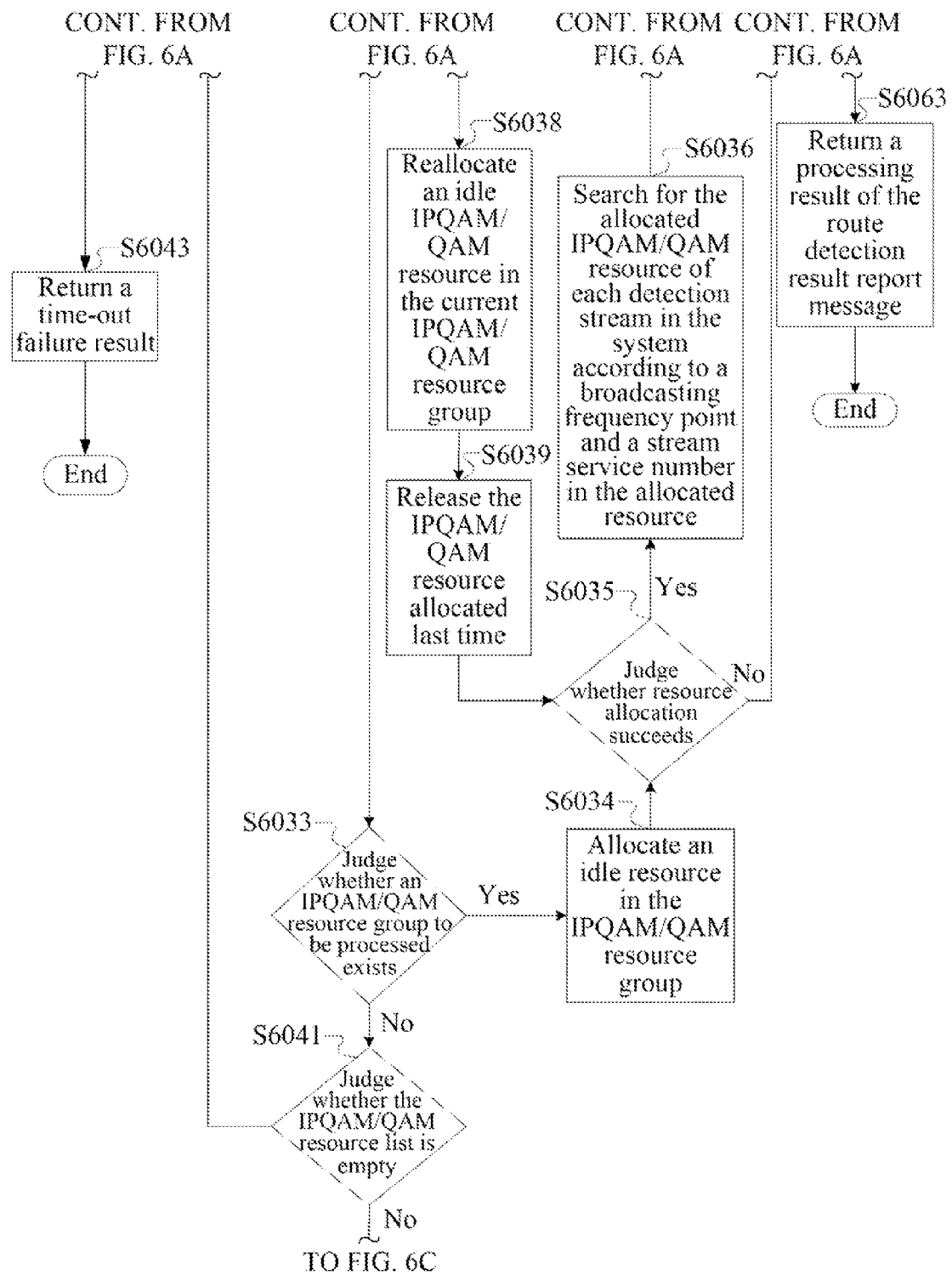
Figure 6C:
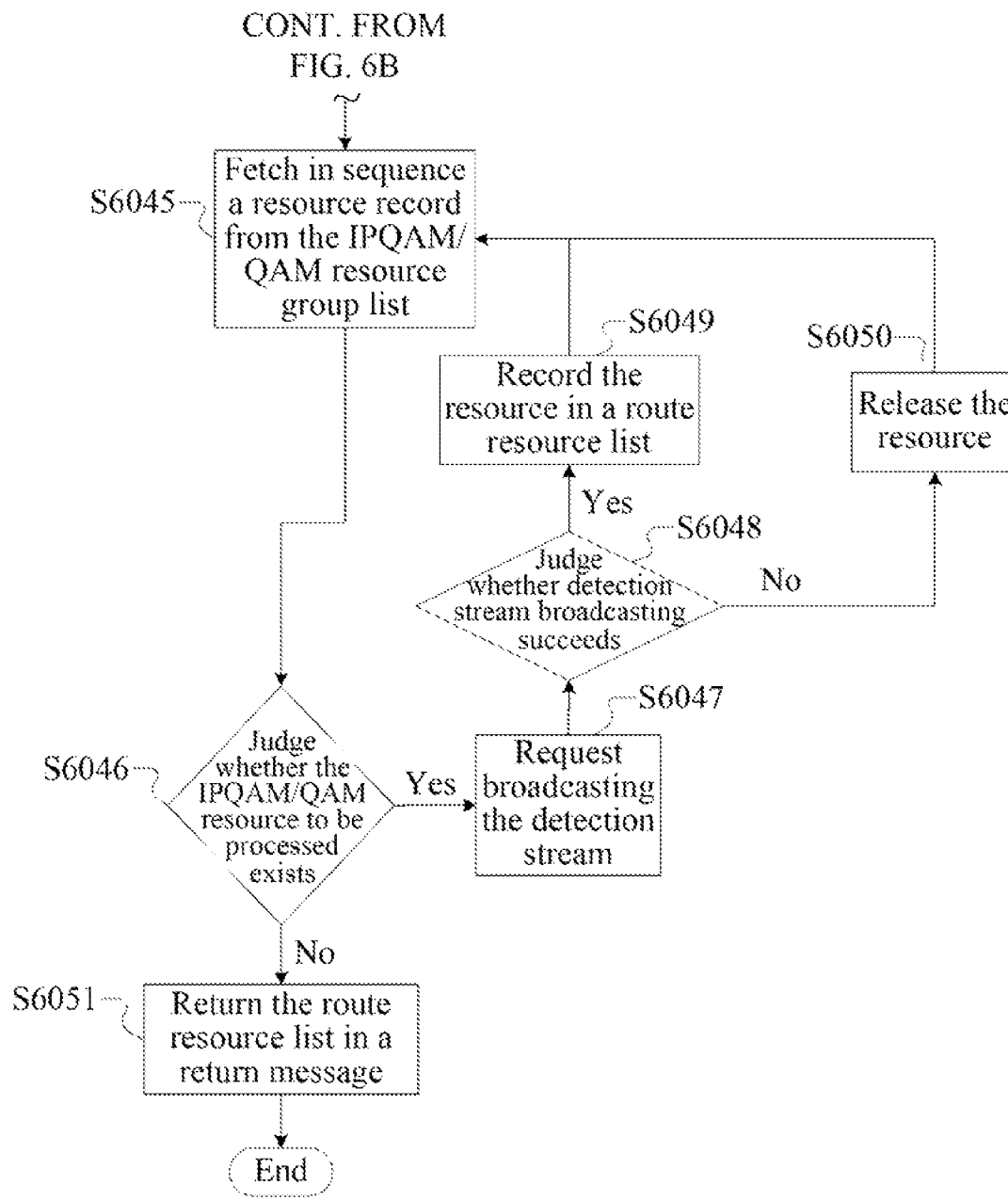

FIG. 6 is a flow chart of a method for allocating a signal route resource in a VOD terminal service according to an embodiment of the present invention. As shown in FIG. 6, the method for allocating the signal route resource in the VOD terminal service includes the following.

Step S601: A VOD server receives a request message sent by a terminal.

In the embodiment of the present invention, the VOD server receives the request message sent by a VOD terminal.

Step S602: The VOD server judges a message type and performs processing as follows according to the message type.

If the message is a route detection message, step S6031 is performed to begin to process the route detection message.

If the message is a route detection result report message, step S6061 is performed to begin to process the route detection result report message.

Step S6031: The VOD server obtains an IPQAM/QAM resource group in a current system to form an IPQAM/QAM resource group list.

Step S6032: The VOD server fetches in sequence a resource group record from the IPQAM/QAM resource group list.

Step S6033: The VOD server judges whether the IPQAM/QAM resource group to be processed exists. Processing according to a result is as follows.

If the resource group record can be fetched, a subsequent process continues to allocate the resource.

If no resource group record exists, step S6041 is performed to judge a situation of the allocated resource list.

Step S6034: The VOD server allocates an idle resource in the fetched IPQAM/QAM resource group.

Step S6035: The VOD server judges a resource allocation result. Processing according to the result is as follows.

If allocation succeeds, step S6036 is performed.

If the allocation fails, it is indicated that no idle resource in the resource group is available, and step S6032 is performed to continue to process the-subsequent resource groups.

Step S6036: The VOD server searches for the allocated IPQAM/QAM resource of each detection stream in the system according to a broadcasting frequency point and a stream service number in the allocated resource.

Step S6037: The VOD server judges a search result. Processing according to the search result is as follows.

If the search result is null it is indicated that none of IPQAM/QAM resources of the detection streams in the system has the same broadcasting frequency point and stream service number as the IPQAM/QAM resource allocated to the current detection stream does, and step S6040 is performed to continue.

If the search result is not null, it indicates a conflict with the broadcasting frequency point and the stream service number in the IPQAM/QAM resource of the existing detection stream and step S6038 is performed to continue.

Step S6038: The VOD server reallocates an idle IPQAM/QAM resource in the current IPQAM/QAM resource group.

Step S6039: The VOD server releases the IPQAM/QAM resource allocated last time, and step S6035 is performed to judge the resource allocation result.

Step S6040: The VOD server records the allocated idle resource in an IPQAM/QAM resource list.

Step S6041: The VOD server judges whether the IPQAM/QAM resource list is empty.

If the IPQAM/QAM resource list is empty, it is indicated that no available resource exists temporarily, and step S6042 is performed to perform time-out judgment.

If the IPQAM/QAM resource list is not empty, it is indicated that an available resource exists, and step S6045 is performed to process detection stream broadcasting.

Step S6042: The VOD server judges whether current message processing times out. Processing according to a judgment result is as follows.

If the current message processing times out, the current message processing fails, and step S6043 is performed to perform time-out returning.

If the current message processing does not time out, step S6044 is performed to perform time delay processing.

Step S6043: The VOD server returns a time-out failure result in a response message of the current message and ends the processing of the route detection request message.

Step S6044: The VOD server performs the time delay processing, and step S6031 is performed to obtain a resource group again to allocate a resource.

Step S6045: The VOD server fetches in sequence a resource record from the IPQAM/QAM resource group list.

Step S6046: The VOD server judges whether the IPQAM/QAM resource to be processed exists. Processing according to a judgment result is as follows.

If the resource record can be fetched, step S6047 is performed to perform detection stream broadcasting processing.

If no resource record exists, step S6051 is performed to return a route resource list.

Step S6047: The VOD server requests broadcasting the detection stream.

Step S6048: The VOD server judges a detection stream broadcasting result, and processing according to a judgment result is as follows.

If the broadcasting succeeds, step S6049 is performed to record in the route resource list.

If the broadcasting fails, step S6050 is performed to release the resource.

Step S6049: The VOD server records the resource in the route resource list, and step S6045 is performed to continue to process a next resource.

Step S6050: The VOD server releases the resource, and step S6045 is performed to continue to process the next resource.

Step S6051: The VOD server returns a successful processing result of the route detection request message, returns the route resource list in a return message, and ends the processing of the route detection request message.

Step S6061: The VOD server releases all the IPQAM/QAM resources in the route resource list.

Step S6062: The VOD server records location information of the VOD terminal according to the route detection result report message.

Step S6063: The VOD server returns a processing result of the route detection result report message and ends the processing of the route detection result report message.

Figure 7A:
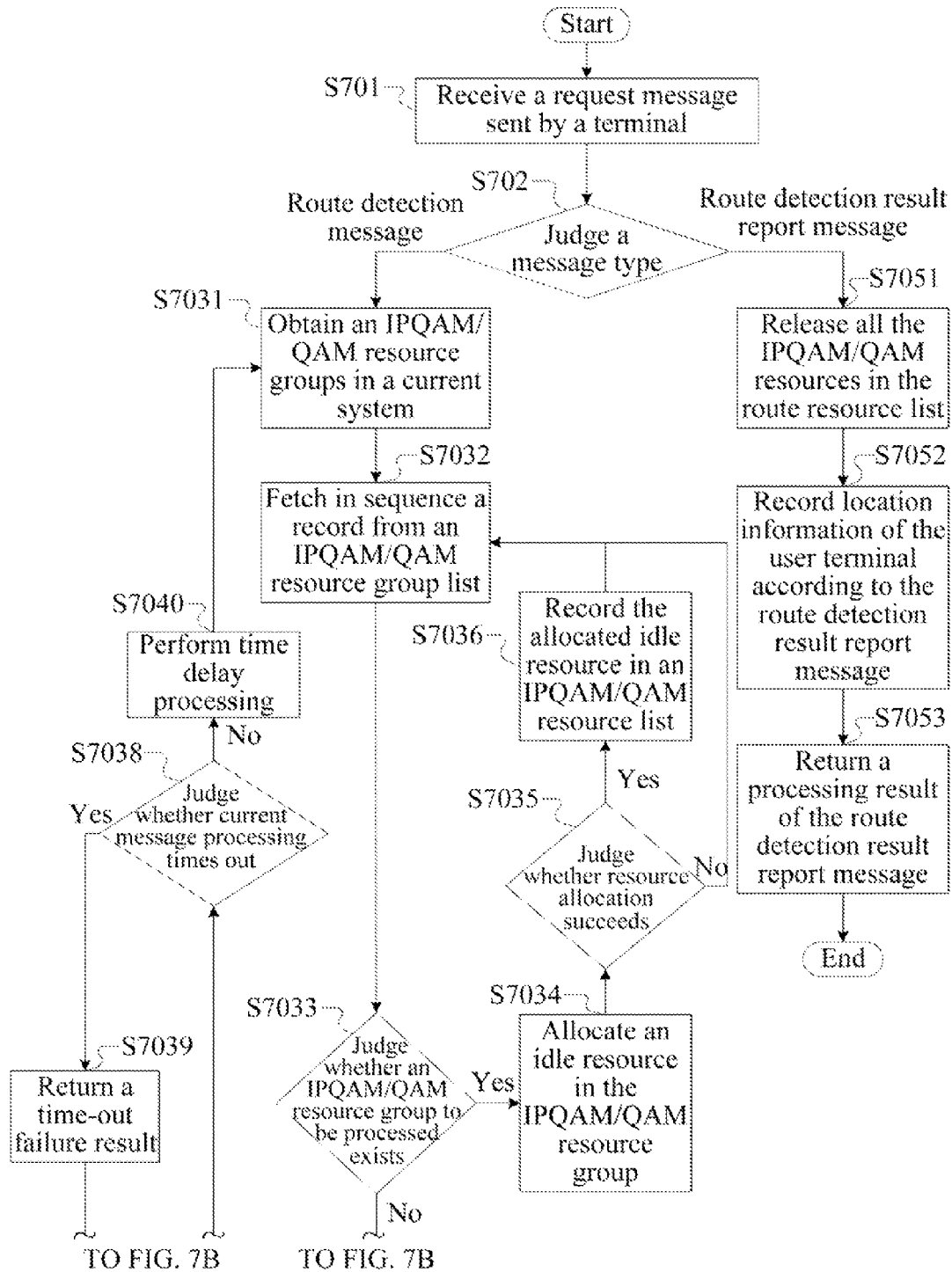
FIG. 7 (7A and 7B) is a flow chart of a method for allocating a signal route resource in a VOD service according to an embodiment of the present invention.
Figure 7B:
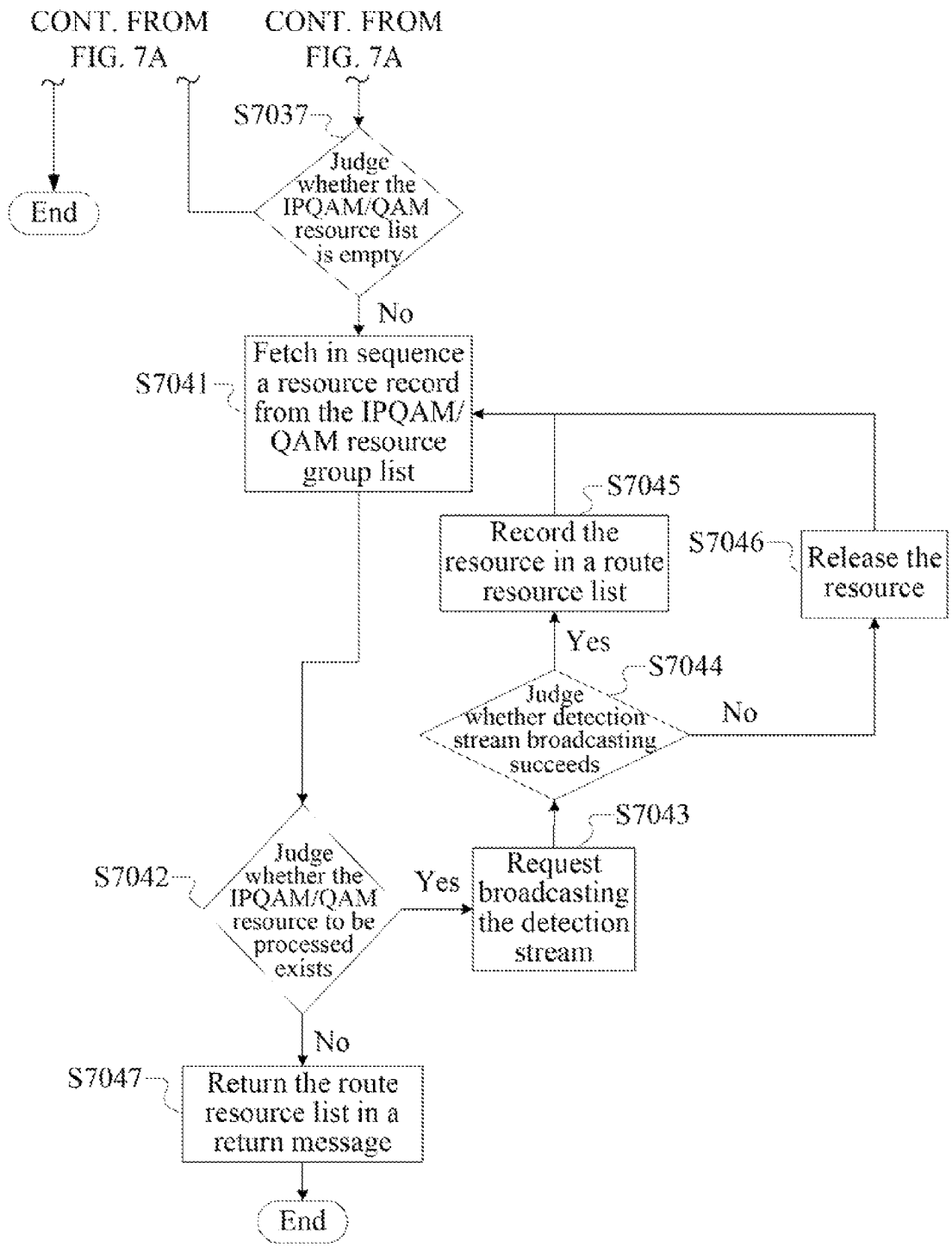

FIG. 7 is a flow chart of a method for allocating a signal route resource in a VOD terminal service according to an embodiment of the present invention. A difference from the embodiment shown in FIG. 6 lies in processing of a route detection request message, where when an IPQAM/QAM resource is allocated, it is not necessary to guarantee that a broadcasting frequency point and a stream service identifier in an IPQAM/QAM resource allocated for broadcasting a current detection stream cannot be the same as those in the IPQAM/QAM resource of other detection stream. As shown in FIG. 7, a route detection method of a VOD terminal includes the following.

Step S701: Receive a request message. In the embodiment of the present invention, a VOD server receives the request message sent by a VOD terminal.

Step S702: Judge a message type, and perform the following processing respectively according to the message type.

If the message is a route detection request message, step S7031 is performed to begin to process the route detection message.

If the message is a route detection result report message, step S7051 is performed to begin to process the route detection result report message.

Step S7031: Obtain IPQAM/QAM resource groups in a current system to form an IPQAM/QAM resource group list.

Step S7032: Fetch in sequence a resource group record from the IPQAM/QAM resource group list.

Step S7033: Judge whether the IPQAM/QAM resource group to be processed exists. Processing according to a judgment result is as follows.

If the resource group record can be fetched, the subsequent process continues to allocate the resource.

If no resource group record exists, step S7037 is performed to judge a situation of the allocated resource list.

Step S7034: Allocate an idle resource in the fetched IPQAM/QAM resource group.

Step S7035: Judge a resource allocation result. Processing according to a judgment result is as follows.

If the allocation succeeds, step S7036 is performed to continue.

If the allocation fails, it is indicated that no idle resource in the resource group is available, and step S7032 is performed to continue to process the subsequent resource groups.

Step S7036: Record the allocated idle resource in an IPQAM/QAM resource list.

Step S7037: Judge whether the IPQAM/QAM resource list is empty.

If the IPQAM/QAM resource list is empty, it is indicated that no available resource exists temporarily, and step S7038 is performed to perform time-out judgment.

If the IPQAM/QAM resource list is not empty, it is indicated that an available resource exists, and step S7041 is performed to process detection stream broadcasting.

Step S7038: Judge whether current message processing times out. Processing according to a judgment result is as follows.

If the current message processing times out, the current message processing fails, and step S7039 is performed to perform time-out returning.

If the current message processing does not time out, step S7040 is performed to perform time delay processing.

Step S7039: Return a time-out failure result in a response message of the current message and ends the processing of the route detection request message.

Step S7040: After time delay is performed for the current processing, perform step S7031 to obtain a resource group again to allocate a resource.

Step S7041: Fetch in sequence a resource record from the IPQAM/QAM resource list.

Step S7042: Judge whether the IPQAM/QAM resource to be processed exists. Processing according to a judgment result is as follows.

If the resource record can be fetched, step S7043 is performed to perform detection stream broadcasting processing.

If no resource record exists, step S7047 is performed to return a route resource list.

Step S7043: Request broadcasting the detection stream. In the embodiment of the present invention, an IPQAM/QAM resource group identifier is obtained according to an indicated IPQAM/QAM resource, then a corresponding detection stream is found according to the IPQAM/QAM resource group identifier, then the output of the detection stream to a designated IPQAM/QAM is completed according to IPQAM/QAM resource information, and the IPQAM/QAM is required to modulate the detection stream according to a designated broadcasting frequency point, stream service identifier, symbol rate, and modulation value and then output the detection stream to the VOD terminal Step S7044: Judge a detection stream broadcasting result, and process according to a judgment result as follows.

If broadcasting succeeds, step S7045 is performed to record in the route resource list.

If the broadcasting fails, step S7046 is performed to release the resource.

Step S7045: Record the resource in the route resource list, and perform step S7041 to continue to process the next resource.

Step S7046: Release the resource, and perform step S7041 to continue to process the next resource.

Step S7047: Return a successful processing result of the route detection request message, return the route resource list in a return message, and end the processing of the route detection request message.

Step S7051: Release all the IPQAM/QAM resources in the route resource list.

Step S7052: Record location information of the VOD terminal according to the route detection result report message.

Step S7053: Return a processing result of the route detection result report message and end the processing of the route detection result report message.

In the embodiment of the present invention, without changing a conventional architecture, through cooperation of the VOD terminal and the VOD server, and by using a signal route detection method, a location of the VOD terminal device is automatically identified, and a corresponding relation between the VOD terminal device and the IPQAM/QAM resource of the VOD server is automatically established. In this way, as long as a VOD terminal device accesses the network, automatic identification of the location of the VOD terminal device and automatic establishment of the resource relation may be realized. Therefore, a complex relation configuration management function is no longer required, and a fixed use location of the VOD terminal device is no longer required, so roaming of the VOD terminal device is easily realized. Furthermore, the automatic identification of the location of the VOD terminal device and the automatic establishment of the resource relation is automatically completed each time the VOD terminal device is started, so when a coverage relation of the IPQAM/QAM resource to the VOD terminal device is changed, the VOD service may be normally supported without any additional processing.

Embodiment 4

Figure 8:
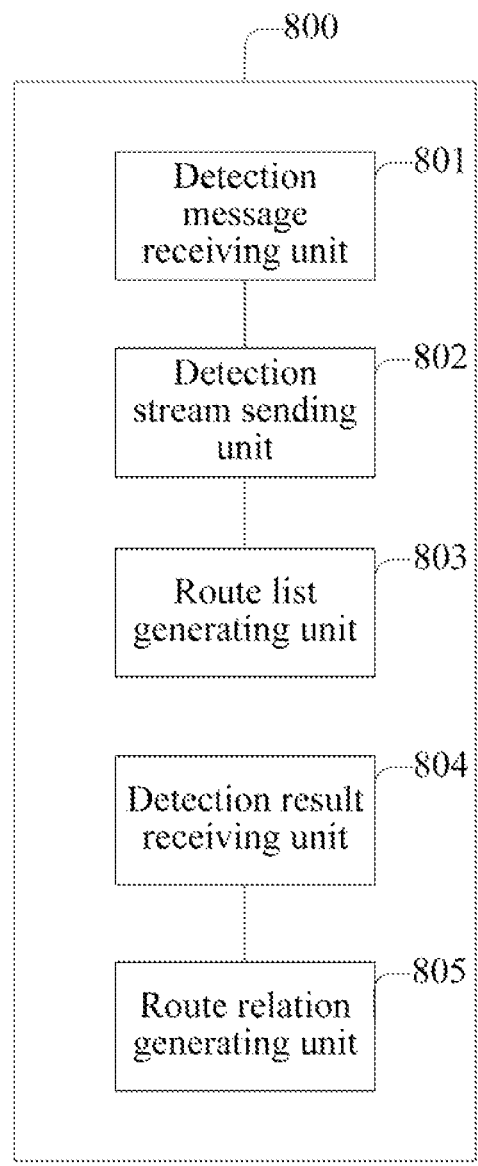
FIG. 8 is a block diagram of a VOD server according to an embodiment of the present invention.

FIG. 8 is a block diagram of a VOD server according to an embodiment of the present invention. As shown in FIG. 8, the VOD server 800 includes the following.

A detection message receiving unit 801 is configured to receive a route detection message sent by a VOD terminal.

In the embodiment of the present invention, the VOD terminal may be a set-top box, and the VOD server may be a VOD system. The VOD server receives the route detection message sent by the VOD terminal. Parameters of the route detection message are VOD terminal device information, at least including: a VOD terminal identifier and an IC card number.

A detection stream sending unit 802 is configured to send a route detection stream according to the received route detection message.

In the embodiment of the present invention, after receiving a route detection message, the VOD server allocates an idle signal route resource in each IPQAM/QAM resource group, where the signal route resource may be an IPQAM/QAM resource, and resource information at least includes an IP address for IPQAM/QAM, an IPQAM/QAM inflow port, a frequency point for broadcasting a program stream, a service identifier of the program stream, a symbol rate, and a modulation value. A list of IPQAM/QAM resource group identifiers and IPQAM/QAM resources, where the list is named an IPQAM/QAM resource list, is finally formed. The VOD server processes in sequence each piece of detection information according to the IPQAM/QAM resource list. The processing of each piece of information includes: firstly, requesting broadcasting the route detection stream; secondly, broadcasting the route detection stream according to IPQAM/QAM designated by the request; thirdly, modulating, by the IPQAM/QAM, the route detection stream and then broadcasting the route detection stream to a user. The VOD server completes, according to indicated IPQAM/QAM resource information, output of the detection stream to the designated IPQAM/QAM and requires the IPQAM/QAM to modulate the detection stream according to a designated broadcasting frequency point, stream service identifier, symbol rate, and modulation value and then output the detection stream to the VOD terminal of a user.

A route list generating unit 803 is configured to generate a route resource list with the signal route resource according to the signal route resource corresponding to the sent route detection stream, and send the route resource list.

In the embodiment of the present invention, the VOD server generates the route resource list with the signal route resource according to the signal route resource corresponding to the sent route detection stream, and sends the route resource list to the VOD terminal of the user.

A detection result receiving unit 804 is configured to receive a valid signal route resource sent by the VOD terminal.

In the embodiment of the present invention, the VOD server receives a route detection report which includes the valid signal route resource and is sent by the VOD terminal.

A route relation generating unit 805 is configured to generate a corresponding relation between the VOD terminal and the signal route resource according to the received valid signal route resource.

In the embodiment of the present invention, after receiving the route detection report that includes the valid signal route resource, the VOD server respectively releases all the IPQAM/QAM resources in the route resource list. The VOD server requests a function of processing a relation between the terminal device and the IPQAM/QAM resource to record a terminal location, fetches a valid signal route resource record in the detection report, and establishes a corresponding relation between the VOD terminal device and the IPQAM/QAM resource group.

In the embodiment of the present invention, without changing a conventional architecture, through cooperation of the VOD terminal and the VOD server, and by using a signal route detection method, a location of the VOD terminal device is automatically identified, and a corresponding relation between the VOD terminal device and the IPQAM/QAM resource of the VOD server is automatically established. In this way, as long as a VOD terminal device accesses the network, automatic identification of the location of the VOD terminal device and automatic establishment of the resource relation may be realized. Therefore, a complex relation configuration management function is no longer required, and a fixed use location of the VOD terminal device is no longer required, so roaming of the VOD terminal device is easily realized. Furthermore, the automatic identification of the location of the VOD terminal device and the automatic establishment of the resource relation is automatically completed each time the VOD terminal device is started, so when a coverage relation of the IPQAM/QAM resource to the VOD terminal device is changed, the VOD service may be normally supported without any additional processing.

Embodiment 5

Figure 9:
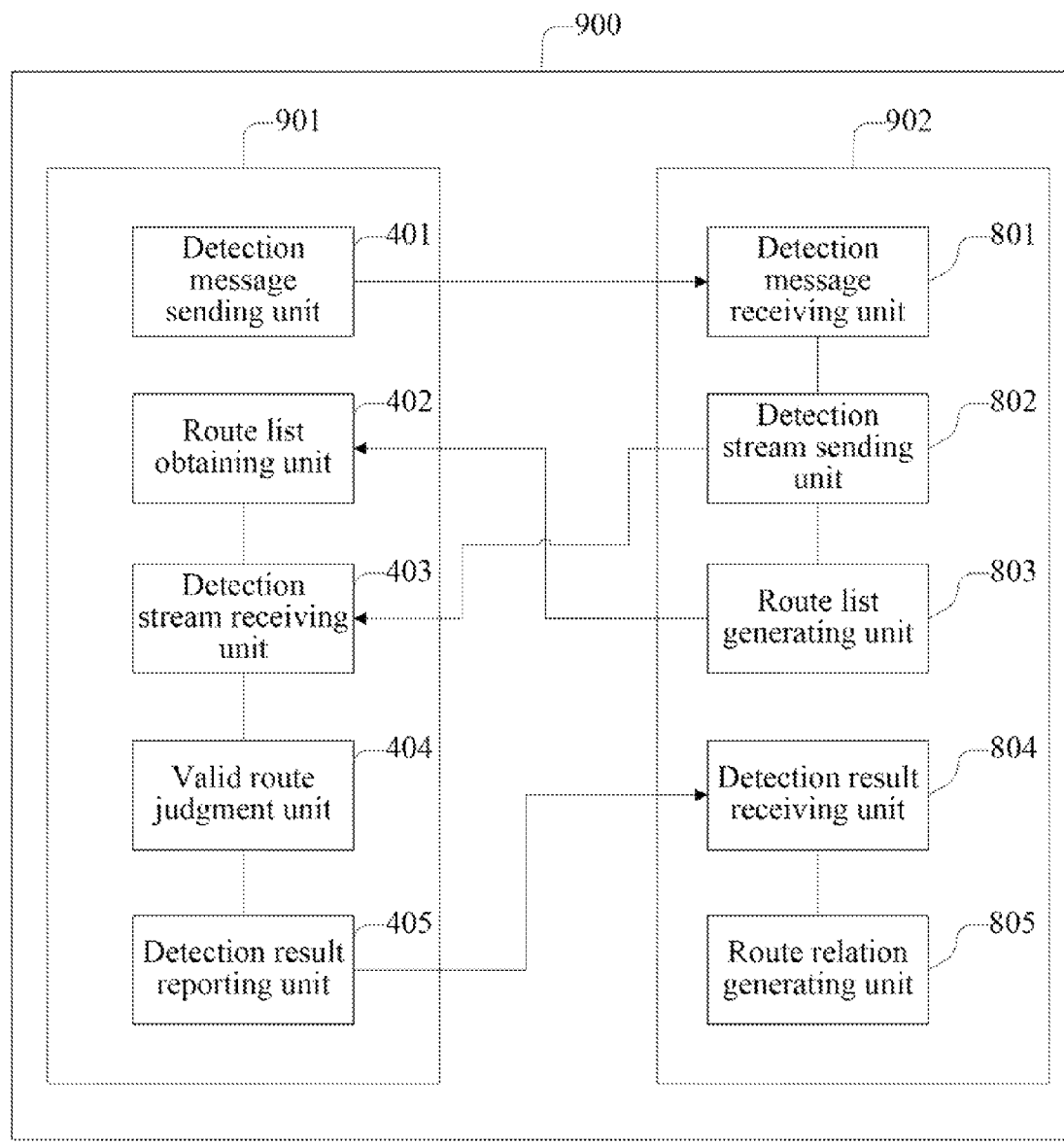
FIG. 9 is a block diagram of a VOD terminal route detection system according to an embodiment of the present invention.

FIG. 9 is a block diagram of a VOD terminal route detection system according to an embodiment of the present invention. As shown in FIG. 9, the VOD terminal route detection system 900 includes a VOD terminal 901 and a VOD server 902, where the VOD terminal 901 is similar to the VOD terminal 400 shown in Embodiment 2, and the VOD server 902 is similar to the VOD server 800 shown in Embodiment 4, so details will not be described herein again.

Figure 10:
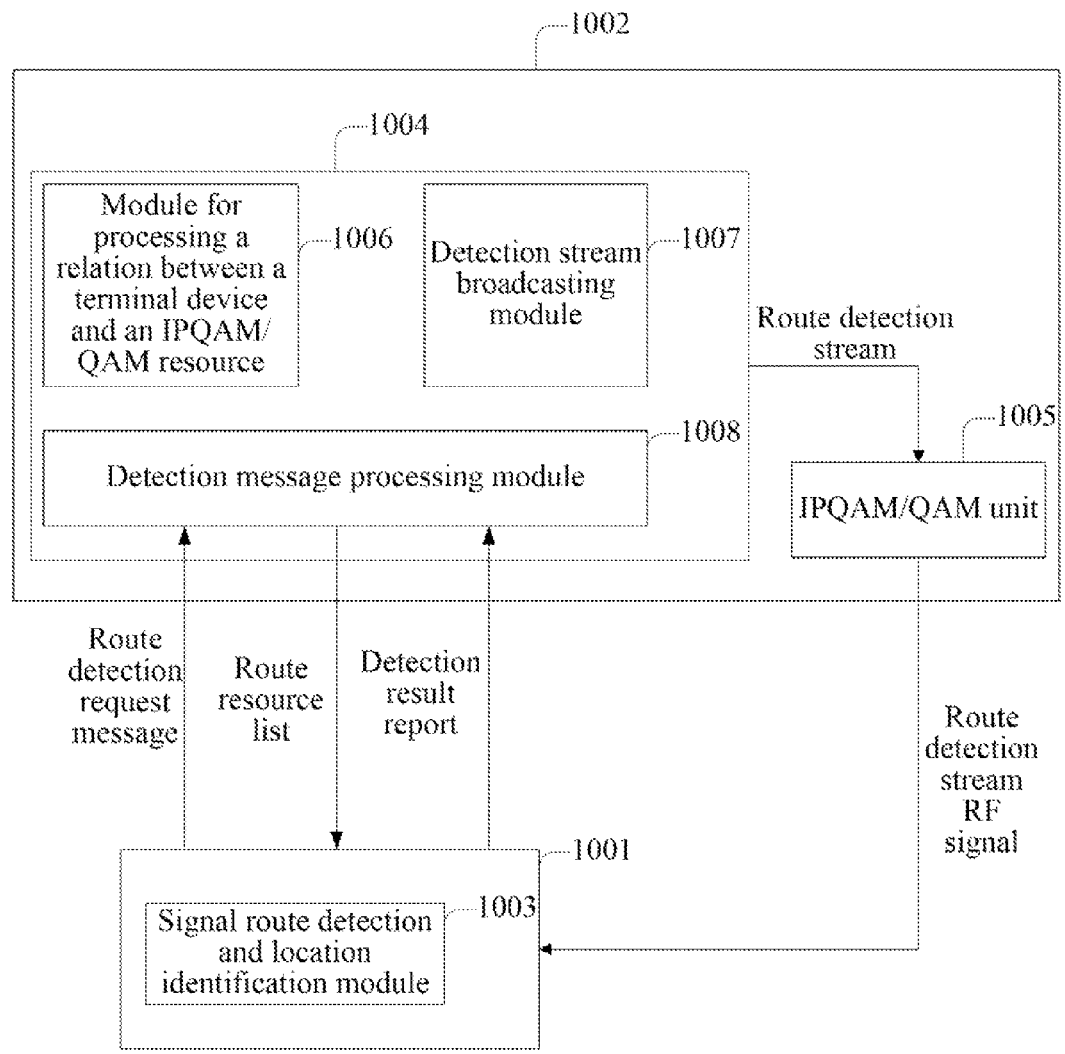
FIG. 10 is a block diagram of a VOD terminal route detection system according to an embodiment of the present invention.
Figure 11:
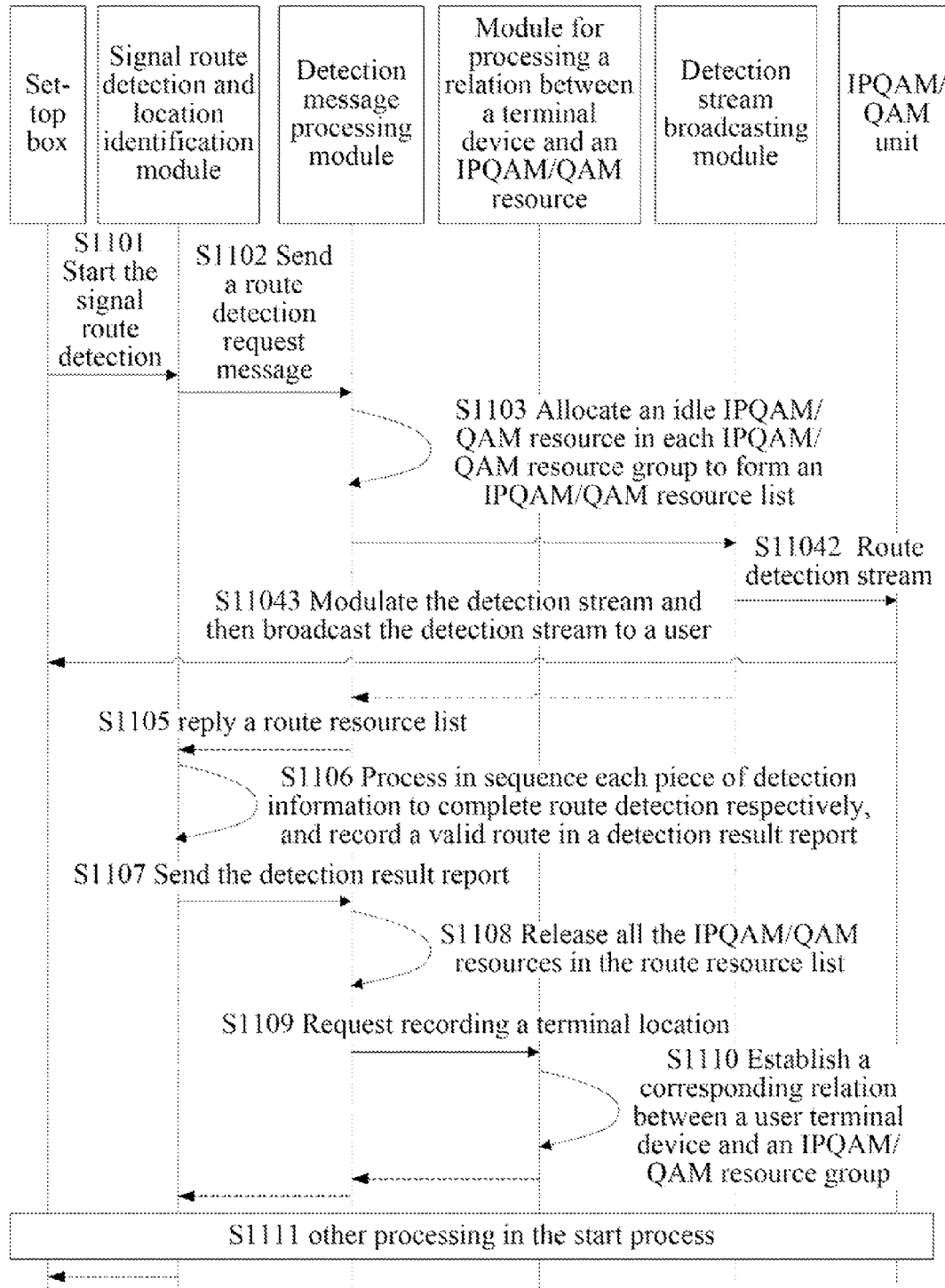
FIG. 11 is a diagram of a processing timing relation of a VOD terminal route detection system 1000 according to an embodiment of the present invention.

FIG. 10 is a block diagram of a VOD terminal route detection system according to an embodiment of the present invention. As shown in FIG. 10, the VOD terminal route detection system includes a VOD terminal 1001 and a VOD server 1002, where the VOD terminal 1001 includes a signal route detection and location identification module 1003, and the VOD server 1002 includes a VOD unit 1004 and an IPQAM/QAM unit 1005, where the VOD unit 1004 includes a module 1006 for processing a relation between a terminal device and an IPQAM/QAM resource, a detection stream broadcasting module 1007, and a detection message processing module 1008. A processing timing relation of the VOD terminal route detection system 1000 is shown in FIG. 11.

Step S1101: The VOD terminal 1001 starts the signal route detection and location identification module 1003 when being started.

Step S1102: The signal route detection and location identification module 1003 sends a route detection request message to the detection message processing module 1008 of the VOD unit 1004, where parameters of the message are VOD terminal device information, at least including: a VOD terminal identifier and an IC card number.

Step S1103: After receiving the route detection request, the detection message processing module 1008 of the VOD unit 1004 in the VOD server 1002 allocates an idle IPQAM/QAM resource in each IPQAM/QAM resource group, where resource information at least includes an IP address for IPQAM/QAM, an IPQAM/QAM inflow port, a frequency point for broadcasting a program stream, a service identifier of the program stream, a symbol rate, and a modulation value. A list of IPQAM/QAM resource group identifiers and IPQAM/QAM resources, where the list is named an IPQAM/QAM resource list, is finally formed.

Step S1104: The detection message processing module 1008 of the VOD unit 1004 in the VOD server 1002 processes in sequence each piece of detection information according to the IPQAM/QAM resource list. The processing of each piece of information includes the following three steps.

Step S11041: Request the detection stream broadcasting module 1007 to broadcast a detection stream.

Step S11042: The detection stream broadcasting module 1007 broadcasts the detection stream according to the IPQAM/QAM unit 1005 designated by the request.

Step S11043: The IPQAM/QAM unit 1005 modulates the detection stream and then broadcasts the detection stream to a user.

Step S1105: The detection message processing module 1008 of the VOD unit 1004 in the VOD server 1002 replies a route resource list to the VOD terminal 1001.

Step S1106: The signal route detection and location identification module 1003 processes in sequence each piece of detection information according to the route resource list to complete route detection respectively, and records a valid route in a detection result report.

Step S1107: The signal route detection and location identification module 1003 sends the detection result report to the detection message processing module 1008 of the VOD unit 1004.

Step S1108: After receiving the route detection report, the detection message processing module 1008 of the VOD server 1002 releases all the IPQAM/QAM resources in the route resource list respectively.

Step S1109: The detection message processing module 1008 of the VOD server 1002 requests the module 1006 for processing the relation between the terminal device and the IPQAM/QAM resource to record a terminal location.

Step S1110: The module 1006 for processing the relation between the terminal device and the IPQAM/QAM resource fetches a valid route record in the detection report, and establishes a corresponding relation between the VOD terminal device and the IPQAM/QAM resource group.

Step S1111: After signal route detection and location identification are completed, the VOD terminal 1001 continues to complete other processing in a start process.

In the embodiment of the present invention, without changing a conventional architecture, through cooperation of the VOD terminal and the VOD server, and by using a signal route detection method, a location of the VOD terminal device is automatically identified, and a corresponding relation between the VOD terminal device and the IPQAM/QAM resource of the VOD server is automatically established. In this way, as long as a VOD terminal device accesses the network, automatic identification of the location of the VOD terminal device and automatic establishment of the resource relation may be realized. Therefore, a complex relation configuration management function is no longer required, and a fixed use location of the VOD terminal device is on longer required, so roaming of the VOD terminal device is easily realized. Furthermore, the automatic identification of the location of the VOD terminal device and the automatic establishment of the resource relation is automatically completed each time the VOD terminal device is started, so when a coverage relation of the IPQAM/QAM resource to the VOD terminal device is changed, the VOD service may be normally supported without any additional processing.

The objectives, technical solutions, and beneficial effects of the present invention are described in further detail through the above specific embodiments. It should be understood that the above descriptions are merely specific embodiments of the present invention, but not intended to limit the protection scope of the present invention. Any modification, equivalent replacement, or improvement made without departing from the spirit and principle of the present invention shall fall within the protection scope of the present invention.

What is claimed is:

1. A method for establishing a relation between a Video On Demand (VOD) terminal and a signal route resource in a VOD service, the method comprising:

sending, by the VOD terminal, a route detection message to a VOD server when the VOD terminal is started, wherein a location of a VOD terminal device is automatically identified and a corresponding relation between the VOD terminal device and an Internet Protocol Quadrature Amplitude Modulation/Quadrature Amplitude Modulation (IPQAM/QAM) resource of the VOD server is automatically established;

receiving, by the VOD terminal, a route resource list replied by the VOD server after the VOD server receives the route detection message, wherein the route resource list comprises multiple pieces of idle signal route resource information;

receiving, by the VOD terminal, a route detection stream according to a signal route resource in the obtained route resource list, wherein the route detection stream includes a detection packet with load information;

determining, by the VOD terminal, that the current signal route resource is valid when determining that the load information in the detection packet is consistent with a signal route resource group identifier in the current signal route resource, wherein the VOD terminal compares the load information, which is fetched in the detection packet, with the signal route resource group identifier in the current signal route resource, and judges a route determined by a resource to be valid only when the load information and an IPQAM/QAM resource group identifier are consistent;

reporting, by the VOD terminal, valid signal route resource information to the VOD server for establishing a relation between the VOD terminal and the valid signal route resource information; and recording, by the VOD terminal, the resource that is proved to be valid in a route detection result report, wherein the report includes at least a VOD terminal identifier and the IPQAM/QAM resource group identifier.

2. The method according to claim 1, wherein a structure of the detection packet complies with a packet structure of a transport stream (TS) in a Digital Video Broadcasting (DVB) standard, and wherein an identifier of the detection packet is selected from packet identifiers in a user-defined segment specified by the DVB standard.

3. A Video On Demand (VOD) terminal, comprising:
a memory configured to store instructions; and
a processor coupled to the memory and configured to execute the instructions to:
send a route detection message to a VOD server when the VOD terminal is started, wherein a location of a VOD terminal device is automatically identified and a corresponding relation between the VOD terminal device and an Internet Protocol Quadrature Amplitude Modulation/Quadrature Amplitude Modulation (IP-QAM/QAM) resource of the VOD server is automatically established;
receive a route resource list replied by the VOD server after the VOD server receives the route detection message, wherein the route resource list comprises multiple pieces of idle signal route resource information;
receive a route detection stream according to a signal route resource in the obtained route resource list;
judge, according to a detection packet in the received route detection stream, whether load information in the detection packet is consistent with a signal route resource group identifier in a current signal route resource;

judge that the current signal route resource is valid when the load information in the detection packet is consistent with the signal route resource group identifier in the current signal route resource, wherein the VOD terminal compares the load information, which is fetched in the detection packet, with the signal route resource group identifier in the current signal route resource, and judges a route determined by a resource to be valid only when the load information and an IPQAM/QAM resource group identifier are consistent;

report valid signal route resource information to the VOD server for establishing a relation between the VOD terminal and the valid signal route resource information; and record, by the VOD terminal, the resource that is proved to be valid in a route detection result report, wherein the report includes at least a VOD terminal identifier and the IPQAM/QAM resource group identifier.

4. A method for allocating a signal route resource in a Video On Demand (VOD) service, comprising:

receiving, by a VOD server, a route detection message sent by a VOD terminal when the VOD terminal is started, wherein a location of a VOD terminal device is automatically identified and a corresponding relation between the VOD terminal device and an Internet Protocol Quadrature Amplitude Modulation/Quadrature Amplitude Modulation (IPQAM/QAM) resource of the VOD server is automatically established;

sending, by the VOD server, a route detection stream according to the received route detection message, wherein the route detection stream comprises a detection packet with load information;

generating, by the VOD server, a route resource list according to the signal route resource corresponding to the sent route detection stream, and sending the route resource list to the VOD terminal, wherein the resource list comprises multiple idle signal router resources;

receiving, by the VOD server, valid signal route resource information in the route resource list sent by the VOD terminal after the VOD terminal judges that the signal route resource is valid, wherein the signal route resource is judged to be valid when the load information in the detection packet is consistent with the signal route resource group identifier in the current signal route resource, wherein the VOD terminal compares the load information, which is fetched in the detection packet, with the signal route resource group identifier in the current signal route resource, and judges a route determined by a resource to be valid only when the load information and an IPQAM/QAM resource group identifier are consistent;

generating, by the VOD server, a corresponding relation between the VOD terminal and the signal route resource information according to the received valid signal route resource information; and recording, by the VOD terminal, the resource that is proved to be valid in a route detection result report, wherein the report includes at least a VOD terminal identifier and the IPQAM/QAM resource group identifier.

5. The method according to claim 4, wherein after generating, by the VOD server, the corresponding relation between the VOD terminal and the signal route resource information according to the received valid signal route resource, the method comprises releasing all the signal route resources in the route resource list.

6. A Video On Demand (VOD) server, comprising:
a memory configured to store instructions; and
a processor coupled to the memory and configured to execute the instructions to:

receive a route detection message sent by a VOD terminal when the VOD terminal is started, wherein a location of a VOD terminal device is automatically identified and a corresponding relation between the VOD terminal device and an Internet Protocol Quadrature Amplitude Modulation/Quadrature Amplitude Modulation (IPQAM/QAM) resource of the VOD server is automatically established;

send a route detection stream according to the received route detection message, wherein the route detection stream comprises a detection packet with load information;

generate a route resource list according to the signal route resource corresponding to the sent route detection stream, and send the route resource list to the VOD terminal, wherein the route resource list comprises multiple pieces of idle signal route resource information;

receive valid signal route resource information sent by the VOD terminal after the VOD terminal judges that the signal route resource is valid, wherein the signal route resource is judged to be valid when the load information in the detection packet is consistent with a signal route resource group identifier in the current signal route resource, wherein the VOD terminal compares the load information, which is fetched in the detection packet, with the signal route resource group identifier in the current signal route resource, and judges a route determined by a resource to be valid only when the load information and an IPQAM/QAM resource group identifier are consistent;

generate a corresponding relation between the VOD terminal and the signal route resource information according to the received valid signal route resource information; and record, by the VOD terminal, the resource that is proved to be valid in a route detection result report, wherein the report includes at least a VOD terminal identifier and the IPQAM/QAM resource group identifier.

7. The method according to claim 1, wherein the multiple pieces of idle signal route resource information comprise an Internet Protocol (IP) address for IPQAM/QAM, an IPQAM/QAM inflow port, a frequency point for broadcasting a program stream, a service identifier of the program stream, a symbol rate, and a modulation value.

8. The method according to claim 1, wherein the valid signal route resource information comprises a VOD terminal identifier and an IPQAM/QAM resource group identifier.

9. The VOD terminal according to claim 3, wherein the multiple pieces of idle signal route resource information comprise an internet protocol(IP) address for IPQAM/QAM, an IPQAM/QAM inflow port, a frequency point for broadcasting a program stream, a service identifier of the program stream, a symbol rate, and a modulation value.

10. The VOD terminal according to claim 3, wherein the valid signal route resource information comprises a VOD terminal identifier and an IPQAM/QAM resource group identifier.

11. The method according to claim 4, wherein the multiple idle signal router resources comprise an Internet Protocol (IP)

address for IPQAM/QAM, an IPQAM/QAM inflow port, a frequency point for broadcasting a program stream, a service identifier of the program stream, a symbol rate, and a modulation value.

12. The method according to claim 4, wherein the valid signal route resource information comprises a VOD terminal identifier and an IPQAM/QAM resource group identifier.

13. The VOD server according to claim 6, wherein the multiple pieces of idle signal route resource information comprise an internet protocol (IP) address for IPQAM/QAM, an IPQAM/QAM inflow port, a frequency point for broadcasting a program stream, a service identifier of the program stream, a symbol rate, and a modulation value.

14. The VOD server according to claim 6, wherein the valid signal route resource information comprises a VOD terminal identifier and an IPQAM/QAM resource group identifier.

15. A system comprising:
a Video On Demand (VOD) terminal; and
a VOD server,
wherein the VOD terminal is configured to:
  send a route detection message to the VOD server when the VOD terminal is started, wherein a location of a VOD terminal device is automatically identified and a corresponding relation between the VOD terminal device and an Internet Protocol Quadrature Amplitude Modulation/Quadrature Amplitude Modulation (IPQAM/QAM) resource of the VOD server is automatically established;
  receive a route resource list replied by the VOD server;
  receive a route detection stream according to a signal route resource in the obtained route resource list after the VOD server receives the route detection message, wherein the route resource list comprises multiple pieces of idle signal route resource information;
  judge, according to a detection packet in the received route detection stream, whether load information in the detection packet is consistent with a signal route resource group identifier in a current signal route resource;
  judge that the current signal route resource is valid when the load information in the detection packet is consistent with the signal route resource group identifier in the current signal route resource, wherein the VOD terminal compares the load information, which is fetched in the detection packet, with the signal route resource group identifier in the current signal route resource, and judges a route determined by a resource to be valid only when the load information and an IPQAM/QAM resource group identifier are consistent;
  report valid signal route resource information to the VOD server; and
  record, by the VOD terminal, the resource that is proved to be valid in a route detection result report, wherein the report includes at least a VOD terminal identifier and the IPQAM/QAM resource group identifier, and
wherein the VOD server is configured to:
  receive a route detection message sent by the VOD terminal;
  send a route detection stream according to the received route detection message, wherein the route detection stream comprises a detection packet with load information;
  generate the route resource list according to the signal route resource corresponding to the sent route detection stream and send the route resource list;
  receive valid signal route resource information in the route resource list sent by the VOD terminal after the VOD terminal judges that the signal route resource is valid; and
  generate a corresponding relation between the VOD terminal and the signal route resource information according to the received valid signal route resource information.

16. The system according to claim 15, wherein the multiple pieces of idle signal route resource information comprise an internet Protocol address for IPQAM/QAM, an IPQAM/QAM inflow port, a frequency point for broadcasting a program stream, a service identifier of the program stream, a symbol rate, and a modulation value.

17. The system according to claim 1, wherein the valid signal route resource information comprises a VOD terminal identifier and an IPQAM/QAM resource group identifier.

* * * * *